United States Patent
Sugishima et al.

[11] Patent Number: 6,120,747
[45] Date of Patent: *Sep. 19, 2000

[54] CATALYST FOR REMOVING ORGANIC HALOGEN COMPOUNDS, PREPARATION METHOD THEREFOR AND METHOD FOR REMOVING ORGANIC HALOGEN COMPOUNDS

[75] Inventors: Noboru Sugishima; Atsushi Morita; Motonobu Kobayashi, all of Himeji, Japan

[73] Assignee: Nippon Shokubai Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/995,099

[22] Filed: Dec. 19, 1997

[30] Foreign Application Priority Data

Dec. 27, 1996 [JP] Japan ................................. 8-349744
Dec. 27, 1996 [JP] Japan ................................. 8-349745

[51] Int. Cl.$^7$ .............. C01B 7/00; A62D 3/00; B01J 23/00
[52] U.S. Cl. .......... 423/240 S; 588/206; 502/350; 502/353; 502/309; 502/242
[58] Field of Search .................. 502/350, 353, 502/309, 242; 423/240 S; 588/206

[56] References Cited

U.S. PATENT DOCUMENTS

| | | | |
|---|---|---|---|
| 3,943,226 | 3/1976 | Difford | 423/230 |
| 4,859,439 | 8/1989 | Rikimaru et al. | 423/239 |
| 4,891,348 | 1/1990 | Imanari et al. | 502/309 |
| 4,892,712 | 1/1990 | Robertson et al. | 422/186 |
| 4,946,661 | 8/1990 | Tachi et al. | 423/239 |
| 4,966,665 | 10/1990 | Ibusuki et al. | 204/157.3 |
| 5,045,288 | 9/1991 | Raupp et al. | 422/186.3 |
| 5,116,579 | 5/1992 | Kobayashi et al. | 422/111 |
| 5,128,301 | 7/1992 | Kobayashi et al. | 502/241 |
| 5,137,855 | 8/1992 | Hegedus et al. | 502/84 |
| 5,254,797 | 10/1993 | Imoto et al. | |
| 5,276,250 | 1/1994 | Hagenmaier et al. | |
| 5,292,704 | 3/1994 | Lester | |
| 5,512,259 | 4/1996 | Hagenmaier et al. | |
| 5,604,339 | 2/1997 | Tabatabaie-Raissi et al. | 204/157.3 |

FOREIGN PATENT DOCUMENTS

| | | |
|---|---|---|
| 0 256 359 A1 | 2/1988 | European Pat. Off. |
| 0 415 145 A1 | 3/1991 | European Pat. Off. |
| 3-12221 | 1/1991 | Japan |
| 3-8415 | 1/1991 | Japan |
| 4-503772 | 7/1992 | Japan |
| 5-337336 | 12/1993 | Japan |
| 6-38863 B2 | 5/1994 | Japan |
| 6-59388 B2 | 8/1994 | Japan |
| 7-75720 | 3/1995 | Japan |
| 7-144117 | 6/1995 | Japan |
| 2609393 B2 | 2/1997 | Japan |
| 2633316 B2 | 4/1997 | Japan |
| 2252707 | 12/1992 | United Kingdom ............. 204/157.3 |
| 9109823 | 7/1991 | WIPO .................................... 204/157.3 |

*Primary Examiner*—Gary P. Straub
*Assistant Examiner*—Melanie C. Wong

[57] ABSTRACT

The present invention provides a catalyst having excellent capability of removing organic halogen compounds such as dioxins, a method for preparing the catalyst, and a method for removing organic halogen compounds using the catalyst. A catalyst for removing organic halogen compounds comprises titanium oxide as a catalyst component and has pores including a group of pores having a pore diameter distribution peak in a range of 0.01 to 0.05 gm and another group of pores having a pore diameter distribution peak in a range of 0.1 to 0.8 μm. Another catalyst for removing organic halogen compounds comprises titanium oxide and a titanium-silicon composite oxide as catalyst components and has pores including a group of pores having a pore diameter distribution peak in a range of 0.01 to 0.05 μm and another group of pores having a pore diameter distribution peak in a range of 0.8 to 4 μm.

31 Claims, 8 Drawing Sheets

CATALYST FOR REMOVING ORGANIC HALOGEN COMPOUNDS, PREPARATION METHOD THEREFOR AND METHOD FOR REMOVING ORGANIC HALOGEN COMPOUNDS

BACKGROUND OF THE INVENTION

A. Technical Field

The present invention relates to a catalyst for removing organic halogen compounds such as dioxins, a method for preparing the catalyst, and a method for removing organic halogen compounds contained in exhaust gases using the catalyst.

B. Background Art

An exhaust gas from an incineration facility for disposing of industrial waste and city waste contains trace amounts of poisonous organic halogen compounds such as dioxins, PCB and chlorophenol. Particularly, dioxins are extremely poisonous even in small quantities and have a serious influence on the human body. Therefore, their removing technology is desired as quickly as possible.

Generally speaking, organic halogen compounds are chemically very stable. Particularly, dioxins are hardly decomposed to such an extent that it is said that they remain in nature semi-permanently. In addition, as their contents in the exhaust gas are extremely small, it is very difficult to remove them efficiently with an exhaust gas disposing catalyst of the prior art.

SUMMARY OF THE INVENTION

A. Objects of the Invention

It is an object of the present invention to provide: a catalyst which is excellent in capability of removing organic halogen compounds and suitable for removing organic halogen compounds contained in exhaust gases; a preparation method therefor; and a method for removing organic halogen compounds contained in exhaust gases using the catalyst.

B. Disclosure of the Invention

The inventors of the present invention recognized that a catalyst comprising titanium oxide is fundamentally effective and found that decomposition reactions of organic halogen compounds could be promoted by well dispersing dilute components into exhaust gases by improving physical properties of the catalyst comprising titanium oxide, specifically, the pore diameter distribution of the catalyst and further the pore volume of the catalyst. The present invention is predicated upon this finding.

That is to say, a first catalyst for removing organic halogen compounds (to be simply referred to as "first catalyst" hereinafter), according to the present invention, is a catalyst which comprises titanium oxide as a catalyst component and has pores including a group of pores having a pore diameter distribution peak in a range of 0.01 to 0.05 μm and another group of pores having a pore diameter distribution peak in a range of 0.1 to 0.8 μm A second catalyst for removing organic halogen compounds (to be simply referred to as "second catalyst" hereinafter), according to the present invention, is a catalyst which comprises titanium oxide and a titanium-silicon composite oxide as catalyst components and has pores including a group of pores having a pore diameter distribution peak in a range of 0.01 to 0.05 μm and another group of pores having a pore diameter distribution peak in a range of 0.8 to 4 μm.

In addition, a method for preparing a catalyst for removing organic halogen compounds, according to the present invention, comprises the steps of:

mixing an easily decomposable substance with a catalyst precursor, wherein: the mixing ratio of the easily decomposable substance to the catalyst precursor is in a range of 0.1 to 30 wt %; the easily decomposable substance has an average particle diameter of 5 to 1,000 μm, a thermal decomposition temperature of 100 to 700° C., and a calorific value during decomposition of 50 kcal/g or less; and the catalyst precursor includes as an essential component either or both of titanium oxide and a substance which is formable into titanium oxide by baking; and removing the easily decomposable substance by baking the resultant mixture.

In addition, a method for removing organic halogen compounds, according to the present invention, is a method for removing organic halogen compounds which comprises the step of bringing an exhaust gas containing an organic halogen compound into contact with the above-mentioned first or second catalyst.

These and other objects and the advantages of the present invention will be more fully apparent from the following detailed disclosure.

DETAILED DESCRIPTION OF THE INVENTION

Catalyst for Removing Organic Halogen Compounds

The first catalyst, according to the present invention, comprises titanium oxide as a catalyst component.

The second catalyst, according to the present invention, comprises titanium oxide and a titanium-silicon composite oxide (to be referred to as "Ti—Si composite oxide" hereinafter) as catalyst components.

As to a source for the titanium oxide, either inorganic or organic compounds as well as titanium oxide can be used if they produce titanium oxide by baking. For example, the following compounds can be used: inorganic titanium compounds such as titanium tetrachloride and titanium sulfate or organic titanium compounds such as titanium oxalate and tetraisopropyl titanate.

As to a titanium source used for the preparation of the Ti—Si composite oxide comprised in the second catalyst, any one of the above-mentioned inorganic and organic compounds can be used. In addition, a silicon source is suitably selected from the group consisting of inorganic silicon compounds such as colloidal silica, water glass, fine particle silicon and silicon tetrachloride and organic silicon compounds such as tetraethyl silicate.

The Ti—Si composite oxide, for example, can be prepared in accordance with any one of the following procedures (a)–(d)

(a) Titanium tetrachloride is mixed with a silica sol and ammonia is added to produce a precipitate. The obtained precipitate is washed, dried and then baked at 300 to 650° C.

(b) An aqueous solution of sodium silicate is added to titanium tetrachloride and a reaction is carried out to produce a precipitate. The obtained precipitate is washed, dried and then baked at 300 to 659° C.

(c) Ethyl silicate (tetraethoxylsilane) is added to a water-alcohol solution of titanium tetrachloride and hydrolyzed to produce a precipitate. The obtained precipitate is washed, dried and then baked at 300 to 650° C.

(d) Ammonia is added to a water-alcohol solution of titanium oxide chloride (oxytitanium trichloride) and ethyl silicate to produce a precipitate. The obtained precipitate is washed, dried and then baked at 300 to 550° C.

Among the above-mentioned methods, the method (a) is particularly preferred. Stated more specifically, the titanium source and the silicon source are used to ensure that their molar ratio become a predetermined value and maintained at 10 to 100° C. in the form of an acidic aqueous solution or sol (acidic aqueous solution or sol having a concentration of 1 to 100 g/liter (in terms of $TiO_2$ as the titanium source and $SiO_2$ as the silicon source)), and ammonia water is added dropwise to the solution or sol as a neutralizer to maintain the solution or sol at a pH of 2 to 10 for 10 minutes to 3 hours so as to produce a coprecipitate of titanium and silicon. This coprecipitate is filtrated, completely washed, dried at 50 to 140° C. for 10 minutes to 3 hours and baked at 400 to 700° C. for 1 to 10 hours to obtain the Ti—Si composite oxide of interest.

The content of the Ti—Si composite oxide in the second catalyst of the present invention is 0.01 to 5 times, preferably 0.05 to 3 times, the weight of titanium oxide.

The first catalyst of the present invention can further comprise either or both of vanadium oxide and tungsten oxide as catalyst components, and preferably further comprises either vanadium oxide of 0.1 to 25 wt % or tungsten oxide of 0.1 to 25 wt % relative to titanium oxide as a catalyst component, or both vanadium oxide of 0.1 to 25 wt % and tungsten oxide of 0.1 to 25 wt % relative to titanium oxide as catalyst components. In other words, a catalyst, which is advantageously used as the first catalyst, comprises titanium oxide and either or both of vanadium oxide of 0.1 to 25 wt %, preferably 1 to 15 wt %, and tungsten oxide of 0.1 to 25 wt %, preferably 1 to 25 wt %, relative to the titanium oxide as catalyst component.

The second catalyst of the present invention can further comprise either or both of vanadium oxide and tungsten oxide as catalyst components, and preferably further comprises either vanadium oxide of 0.1 to 25 wt % or tungsten oxide of 0.1 to 25 wt % relative to the total amount of the titanium oxide and the Ti—Si composite oxide as a catalyst component, or both vanadium oxide of 0.1 to 25 wt % and tungsten oxide of 0.1 to 25 wt % relative to the total amount of the titanium oxide and the Ti—Si composite oxide as catalyst components. In other words, a catalyst, which is advantageously used as the first catalyst, comprises titanium oxide, the Ti—Si composite oxide, and either or both of vanadium oxide of 0.1 to 25 wt %, preferably 1 to 15 wt %, and tungsten oxide of 0.1 to 25 wt %, preferably 1 to 25 wt %, relative to the total amount of the titanium oxide and the Ti—Si composite oxide as catalyst components.

In the catalyst of the invention, when the content of vanadium oxide and/or tungsten oxide is smaller than 0.1 wt %, the effect of addition cannot be fully obtained, and when the content is larger than 25 wt %, not so large improvement on activity is observed. The activity may lower as the case may be.

As source for vanadium oxide and tungsten oxide may be used inorganic or organic compounds if they produce oxide by baking in addition to vanadium oxide and tungsten oxide. For example, hydroxides, ammonium salts, oxalates, halides, sulfates and nitrates containing each metal element may be used.

The first catalyst comprises the above-mentioned catalyst components and has pores including a group of pores having a pore diameter distribution peak in a range of 0.01 to 0.05 $\mu$m (which may be referred to as "first group of pores" hereinafter) and another group of pores having a pore diameter distribution peak in a range of 0.1 to 0.8 $\mu$m (which may be referred to as "second group of pores" hereinafter). The first group of pores is also a group consisting of pores having a pore diameter in a range of 0.01 to 0.05 $\mu$m, and the second group of pores is a group consisting of pores having a pore diameter in a range of 0.1 to 0.8 $\mu$m.

The second catalyst comprises the above-mentioned catalyst components and has pores including a group of pores having a pore diameter distribution peak in a range of 0.01 to 0.05 $\mu$m (which may be referred to as "first group of pores" hereinafter) and another group of pores having a pore diameter distribution peak in a range of 0.8 to 4 $\mu$m (which may be referred to as "third group of pores" hereinafter). The first group of pores is also a group consisting of pores having a pore diameter in a range of 0.01 to 0.05 $\mu$m, and the third group of pores is a group consisting of pores having a pore diameter in a range of 0.8 to 4 $\mu$m.

In the present invention, the pores of the catalyst have two substantially independent pore diameter distribution peaks as shown in FIGS. 1 to 3 and 5 to 7, and the pore diameter distributions of pore diameter groups having each peak are narrow and substantially uniform. Preferably, the pore diameter distribution peak is only one in each pore diameter range. As a matter of course, the pore diameter distribution may not be substantially uniform and the pore diameter distribution peaks may have a shoulder. However, a catalyst having pores with a substantially uniform pore diameter distribution is particularly preferred.

Preferably, the catalyst of the present invention has a total pore volume in a range of 0.2 to 0.6 cc/g measured by a mercury press-fit method.

Preferably, in the first catalyst, the pore volume of the first group of pores is in a range of 10 to 60% of the total pore volume, and that of the second group of pores is in a range of 10 to 60% of the total pore volume.

Preferably, in the second catalyst, the pore volume of the first group of pores is in a range of 20 to 60% of the total pore volume, and that of the third group of pores is in a range of 10 to 50% of the total pore volume.

In the first and second catalyst, the pore volume of each group of pores is the total volume of each group of pores in each pore diameter range.

The catalyst of the present invention has an average particle diameter in a range of 0.001 to 100 $\mu$m, preferably in a range 0.01 to 100 $\mu$m.

The catalyst of the present invention has a specific surface area in a range of 30 to 250 m$^2$/g, preferably 40 to 200 m$^2$/g, as measured by a BET method.

Therefore, a preferably used one of the first catalysts is a catalyst which comprises titanium oxide as a catalyst component and has a total pore volume measured by a mercury press-fit method of 0.2 to 0.6 cc/g and pores including a group of pores having a pore diameter distribution peak in a range of 0.01 to 0.05 μm and another group of pores having a pore diameter distribution peak in a range of 0.1 to 0.8 μm, wherein the pore volume of the group of pores having a pore diameter distribution peak in a range of 0.01 to 0.05 μm accounts for 10 to 60% of the total pore volume, and wherein the pore volume of the group of pores having a pore diameter distribution peak in a range of 0.1 to 0.8 μm accounts for 10 to 60% of the total pore volume.

A particularly preferable one of the first catalysts is a catalyst which comprises titanium oxide and vanadium oxide of 0.1 to 25 wt % and/or tungsten oxide of 0.1 to 25 wt % relative to titanium oxide as catalyst components and has a total pore volume measured by a mercury press-fit method of 0.2 to 0.6 cc/g and pores including a group of pores having a pore diameter distribution peak in a range of 0.01 to 0.05 μm and another group of pores having a pore diameter distribution peak in a range of 0.1 to 0.8 μm, wherein the pore volume of the group of pores having a pore diameter distribution peak in a range of 0.01 to 0.05 μm accounts for 10 to 60% of the total pore volume, and wherein the pore volume of the group of pores having a pore diameter distribution peak in a range of 0.1 to 0.8 μm accounts for 10 to 60% of the total pore volume.

A preferably used one of the second catalysts is a catalyst which comprises titanium oxide and the Ti—Si composite oxide as catalyst components and has a total pore volume measured by a mercury press-fit method of 0.2 to 0.6 cc/g and pores including a group of pores having a pore diameter distribution peak in a range of 0.01 to 0.05 μm and another group of pores having a pore diameter distribution peak in a range of 0.8 to 4 μm, wherein the pore volume of the group of pores having a pore diameter distribution peak in a range of 0.01 to 0.05 μm accounts for 20 to 60% of the total pore volume, and wherein the pore volume of the group of pores having a pore diameter distribution peak in a range of 0.8 to 4 μm accounts for 10 to 50% of the total pore volume.

A particularly preferable one of the second catalysts is a catalyst which comprises as catalyst components titanium oxide, the Ti—Si composite oxide, and vanadium oxide of 0.1 to 25 wt % and/or tungsten oxide of 0.1 to 25 wt % relative to the total amount of the titanium oxide and the Ti—Si composite oxide and has a total pore volume measured by a mercury press-fit method of 0.2 to 0.6 cc/g and pores including a group of pores having a pore diameter distribution peak in a range of 0.01 to 0.05 μm and another group of pores having a pore diameter distribution peak in a range of 0.8 to 4 μm, wherein the pore volume of the group of pores having a pore diameter distribution peak in a range of 0.01 to 0.05 μm accounts for 20 to 60% of the total pore volume, and wherein the pore volume of the group of pores having a pore diameter distribution peak in a range of 0.8 to 4 μm accounts for 10 to 50% of the total pore volume.

More preferably, the above-mentioned preferable catalyst has a specific surface area measured by a BET method of 30 to 250 m$^2$/g. More preferably, the catalyst has an average particle diameter in a range of 0.001 to 100 μm.

The shape of the catalyst of the present invention is not particularly limited and may be any desired shape selected from such as plate-like, wavy, net-like, honeycomb-like, columnar or cylindrical shape. It may be carried on a carrier having a desired shape selected from such as plate-like, wavy, net-like, honeycomb-like, columnar or cylindrical shape and made from alumina, silica, cordierite, titania and stainless metal.

The catalyst of the present invention has excellent activity of decomposing organic halogen compounds such as dioxins and is advantageously used for the disposal of various exhaust gases containing these organic halogen compounds.

The catalyst of the present invention can be prepared by any method, and the present invention preparation method as mentioned in detail below is only a preferable example thereof, in other words, the preparation method for the catalyst is not limited thereto.

Preparation Method for Catalyst

The preparation method for the first catalyst of the present invention is described hereinunder, taking the case of a catalyst comprising titanium oxide and vanadium oxide and/or tungsten oxide as catalyst components.

A method A is the so called "coprecipitation method". In the method, a soluble titanium compound such as titanium tetrachloride and a soluble tungsten compound such as ammonium metatungstate are dissolved in water to prepare an acidic titanium-tungsten containing aqueous solution. Thereafter, ammonia water is added for coprecipitation until the final pH becomes 5 to 8, preferably 5 or more and less than 7, while this aqueous solution is maintained at 60° C. or less, preferably 0 to 50° C. When an aqueous solution of the tungsten compound is basic, the tungsten-containing aqueous solution is added to a titanium-containing aqueous solution simultaneously with ammonia water for precipitation.

The "final pH" means the pH of a precipitated slurry or gel when a precipitation operation is completed.

When the temperature of the above-mentioned precipitation operation is more than 60° C., the activity of the obtained catalyst lowers. When the final pH is lower than 5, the activity of the obtained catalyst lowers and when it is higher than 8, the activity of the catalyst lowers and the re-dissolution of tungsten occurs as well.

The titanium-tungsten precipitate obtained by the above-mentioned precipitation operation is separated from the precipitated slurry, well rinsed, dried and baked to obtain titanium-tungsten oxide. The above-mentioned separation, rinsing, drying and baking operations can be carried out under conditions which are generally employed for the preparation of this type of oxide. When the titanium-tungsten precipitate having a titanium oxide/tungsten oxide weight ratio of 10/1 to 3/1, preferably 20/1 to 4/1, is baked at 300 to 700° C., particularly preferably 350 to 600° C., titanium-tungsten oxide having excellent durability is obtained.

A method B is to carry vanadium oxide and/or tungsten oxide on titanium oxide. For example, titanium-vanadium and/or tungsten oxide is obtained by adding a vanadium and/or tungsten salt powder or solution of the salt to a titanium oxide powder or slurry, or by impregnating a titanium oxide compact with a vanadium and/or tungsten salt solution. Baking conditions are the same as the above-mentioned method A.

A method C is to carry vanadium oxide and/or tungsten oxide on titanium oxide carrying tungsten oxide or a uniformly dense mixture of titanium oxide and tungsten oxide.

A catalyst obtained by the above-mentioned method C is excellent in removing capability organic halogen compound. Although the reason for this is unknown, it is considered that tungsten oxide spread over titanium oxide contributes to the decomposition of an organic halogen compound and further improves the activity of other active species. From this view point, titanium oxide carrying tungsten oxide is preferably a uniformly dense mixture of titanium oxide and tungsten oxide in which tungsten oxide is well dispersed because its catalytic activity is high. The "uniformly dense mixture of titanium oxide and tungsten oxide" is characterized in that substantially no peak derived from tungsten oxide is observed by the X-ray diffraction of titanium oxide and tungsten oxide as titanium oxide and tungsten oxide are mixed together at a high degree.

A preferably used one of the above-mentioned methods A to C is the method C, namely, the method comprising the steps of carrying tungsten oxide on titanium oxide and then further carrying vanadium oxide and/or tungsten oxide on the titanium oxide supporting tungsten oxide, or the method comprising the steps of preparing a uniformly dense mixture of titanium oxide and tungsten oxide and carrying vanadium oxide and/or tungsten oxide on this mixture.

The second catalyst of the present invention also can be prepared in accordance with various procedures. A catalyst comprising titanium oxide, Ti—Si composite oxide and vanadium oxide and/or tungsten oxide as catalyst components, for example, can be prepared as follows:

(1) Titanium oxide, Ti—Si composite oxide and vanadium oxide and/or tungsten oxide are mixed together in an arbitrary order.
(2) Tungsten oxide is carried on titanium oxide (W oxide/Ti oxide) and this is mixed with Ti—Si composite oxide.
(3) W oxide/Ti oxide, Ti—Si composite oxide and vanadium oxide and/or tungsten oxide are mixed together in a desired order.

The above-mentioned W oxide/Ti oxide, for example, can be prepared by preparation method A (coprecipitation method) for the first catalyst.

In addition, W oxide/Ti oxide is obtained as follows: A tungsten salt or solution is added to a titanium oxide powder or slurry, or a titanium oxide compact is impregnated with a solution of a tungsten salt to carry it and baked as described above to obtain W oxide/Ti oxide.

Further, in the above-mentioned method (3) vanadium oxide and/or tungsten oxide may be carried on W oxide/Ti oxide or a uniformly dense mixture of titanium oxide and tungsten oxide.

The second catalyst obtained by the above-mentioned method (3) including carrying step is excellent in removing capability organic halogen compound. Although the reason for this is unknown, it is considered that tungsten oxide spread over titanium oxide contributes to the decomposition of an organic halogen compound and further improves the activity of other active species. From this view point, titanium oxide carrying tungsten oxide is preferably a uniformly dense mixture of titanium oxide and tungsten oxide in which tungsten oxide is well dispersed because its catalytic activity is high. The "uniformly dense mixture of titanium oxide and tungsten oxide" is characterized in that substantially no peak derived from tungsten oxide is observed by the X-ray diffraction of titanium oxide and tungsten oxide as titanium oxide and tungsten oxide are mixed together at a high degree.

A preferably used one of the above-mentioned methods (1)–(3) is the method (3), that is, the method comprising the steps of carrying tungsten oxide on titanium oxide and then carrying vanadium oxide and/or tungsten oxide on the titanium oxide supporting tungsten oxide, or the method comprising the steps of preparing a uniformly dense mixture of titanium oxide and tungsten oxide and carrying vanadium oxide and/or tungsten oxide on this mixture.

The catalyst having physical properties specified by the present invention can be prepared by ① a method for controlling means of grinding a catalyst powder to an appropriate diameter, or in the methods A to C and (1) to (3), preferably in the method C for the first catalyst, ② a method for controlling the amounts of a molding aid, such as starch, and water to be added upon kneading and controlling the degree of kneading, or ③ (a method for adding a resin which decomposes or volatilizes when a catalyst is baked at the time of kneading. The catalyst can also be prepared by combining these methods.

Among these methods, a preferable method is a method, such as the methods ② and ③, in which a compound such as molding aids and resins which decomposes or volatilizes in the baking step (to be referred to as "easily decomposable substance" in the present invention) is added at the time of preparing a catalyst so that, before baking, a predetermined amount thereof is present in a catalyst precursor including as an essential component either or both of titanium oxide and a substance which is formable into titanium oxide by baking, and this easily decomposable substance is removed by baking in the subsequent baking step.

Therefore, a method comprising the steps of carrying tungsten oxide on titanium oxide and then carrying vanadium oxide and/or tungsten oxide on the titanium oxide supporting tungsten oxide, or preparing a uniformly dense mixture of titanium oxide and tungsten oxide and then carrying vanadium oxide and/or tungsten oxide on this uniformly dense mixture, and further causing an easily decomposable substance to be present in a catalyst precursor and decomposing or volatilizing the compound in the subsequent baking step to remove it is advantageously used for the preparation of the first catalyst comprising titanium oxide and vanadium oxide and/or tungsten oxide of the present invention.

Examples of the resin to be added at the time of kneading in method ③ above include acetal resins, acrylic resins, methacrylic resins, phenol resins, benzoguanamine resins, and unsaturated polyester resins.

The average particle diameter of the easily decomposable substance such as resins as mentioned above is preferably in a range of 5 to 1,000 μm, and the amount of the addition of the easily decomposable substance is preferably in a range of 0.1 to 30 wt % of the aforementioned catalyst precursor. Where the average particle diameter or the amount of the addition of the easily decomposable substance exceeds these ranges, physical properties as specified by the present invention cannot be obtained. Incidentally, where the amount of the addition of the easily decomposable substance is too large, the mechanical strength of the resultant catalyst is low. When the catalyst is baked, the easily decomposable substance thermally decomposes and vaporizes to leave pores behind. The thermal decomposition temperature of the easily decomposable substance is preferably in a range of 100 to 700° C., and the calorific value of the easily decomposable substance during decomposition thereof is preferably 50 kcal/g or less. Where the thermal decomposition temperature of the easily decomposable substance is higher than 700° C., the easily decomposable substance might remain unbaked after baking the catalyst. In addition, where the calorific value of the easily decomposable substance during decomposition thereof is more than 50 kcal/g, great heat is generated during the baking of the catalyst, and the resultant specific surface area of the catalyst is small, and further, the sintering of active components is caused.

Method for Removing Organic Halogen Compounds

The method for removing organic halogen compounds is a method which comprises the step of bringing an exhaust gas containing an organic halogen compound into contact with the above-mentioned first or second catalyst of the present invention and/or the catalyst as obtained by the preparation method of the present invention, thus removing the organic halogen compound from the exhaust gas. Conditions for the removal are not particularly limited, and conditions which are generally used for this type of reaction can be used. Stated more specifically, conditions may be suitably determined in consideration of type and properties of an exhaust gas, required decomposition rate of an organic halogen compound and the like.

The space velocity of an exhaust gas is generally 100 to 100,000 $Hr^{-1}$, preferably 200 to 50,000 $Hr^{-1}$ (STP). If the space velocity is lower than 100 $Hr^{-1}$, a disposing apparatus will be too bulky inefficiently. On the other hand, if the space velocity is higher than 100,000 $Hr^{-1}$, the decomposition efficiency will lower. It is recommended to carry out contact decomposition at a temperature range of 130 to 350° C.

(Effects and Advantages of the Invention)

The catalyst of the present invention is excellent in capability of removing organic halogen compounds and therefore advantageously used to remove organic halogen compounds by disposing of various exhaust gases containing organic halogen compounds.

The catalyst of the present invention is also excellent in capability of removing nitrogen oxides (NOx) (denitrating properties).

Therefore, the catalyst of the present invention is useful as a catalyst for simultaneously removing organic halogen compounds and nitrogen oxides contained in exhaust gases.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited to the below-mentioned examples.

In Examples 1-1 to 1-4 and Comparative Example 1-1, the first group of pores is a group of pores having a pore diameter distribution peak within the range of 0.01 to 0.05 μm, and the second group of pores is a group of pores having a pore diameter distribution peak within the range of 0.1 to 0.8 μm. In Examples 2-1 to 2-4 and Comparative Example 2-1, the first group of pores is a group of pores having a pore diameter distribution peak within the range of 0.01 to 0.05 μm, and the third group of pores is a group of pores having a pore diameter distribution peak within the range of 0.8 to 4 μm.

EXAMPLE 1-1

A solution of 1.4 kg of ammonium metavanadate, 1.7 kg of oxalic acid and 0.4 kg of monoethanolamine dissolved in 5 liters of water was added to 20 kg of a commercially available titanium oxide powder (DT-51 (trade name) of Rohne Poolan Co.), and further 1 kg of phenol resin (Belpar (trade name) of Kanebo Co.) and 0.5 kg of starch as a molding aid were added to and mixed with the resulting mixture, and kneaded with a kneader. The resulting mixture was molded into a honeycomb-like form having an outer size of 80 mm×80 mm, an opening of 4.0 mm, a wall thickness of 1.0 mm and a length of 500 mm by an extrusion molding machine. Thereafter, the form was dried at 80° C. and baked at 450° C. for 5 hours in an air atmosphere to obtain a catalyst 1-A.

Figure 1:
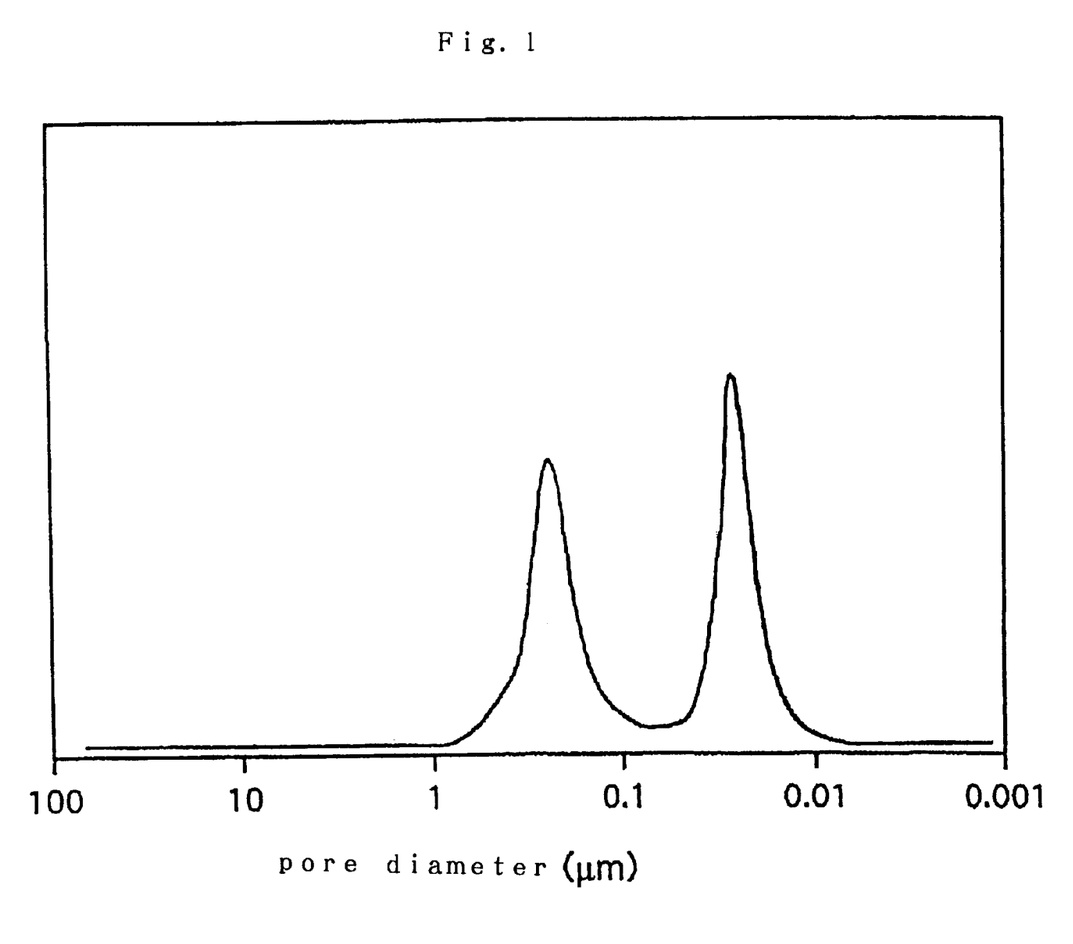
FIG. 1 shows the pore diameter distribution of a catalyst 1-A obtained in Example 1-1.

The composition of the catalyst 1-A was $V_2O_5:TiO_2=5:95$ (weight ratio). When the pore diameter distribution of the catalyst 1-A was measured by a mercury press-fit porosimeter, the total pore volume of the catalyst 1-A was 0.35 cc/g and the pore volume of the first group of pores and that of the second group of pores were 44% and 46% of the total pore volume, respectively. The specific surface area measured by a BET method of the catalyst 1-A was 68 $m^2/g$. The pore diameter distribution of the catalyst 1-A is shown in FIG. 1.

EXAMPLE 1-2

180 liters of a titanium sulfate solution (titanium dioxide concentration of 100 g/liter) obtained from the production process of titanium oxide by a sulfuric acid method was heated at 100° C., and 5 liters of a 10% methylamine aqueous solution of ammonium paratungstate (tungsten trioxide concentration of 400 g/liter) was added to the obtained titanium oxide sol. Ammonia water was added until pH became 8 while the solution was stirred and further left to be aged for 2 hours. The thus obtained titanium-tungsten precipitate slurry was filtrated, and the obtained titanium-tungsten precipitate was washed with water, dried at 100° C. for 12 hours and baked at 500° C. for 3 hours to obtain a titanium-tungsten oxide powder (titanium oxide/tungsten oxide weight ratio of 90/10). According to the X-ray diffraction of this oxide, a peak derived from tungsten oxide was not observed.

A solution of 1.4 kg of ammonium metavanadate, 1.7 kg of oxalic acid and 0.4 kg of monoethanolamine dissolved in 5 liters of water was added to 20 kg of this titanium-tungsten oxide powder, and further 1 kg of phenol resin (Belpar (trade name) of Kanebo Co.) and 0.5 kg of starch as a molding aid were added to and mixed with this resulting mixture and kneaded with a kneader. The resulting mixture was molded into a honeycomb-like form having an outer size of 80 mm×80 mm, an opening of 4.0 mm, a wall thickness of 1.0 mm and a length of 500 mm by an extrusion molding machine. Thereafter, this form was dried at 80° C. and baked at 450° C. for 5 hours in an air atmosphere to obtain a catalyst 1-B.

Figure 2:
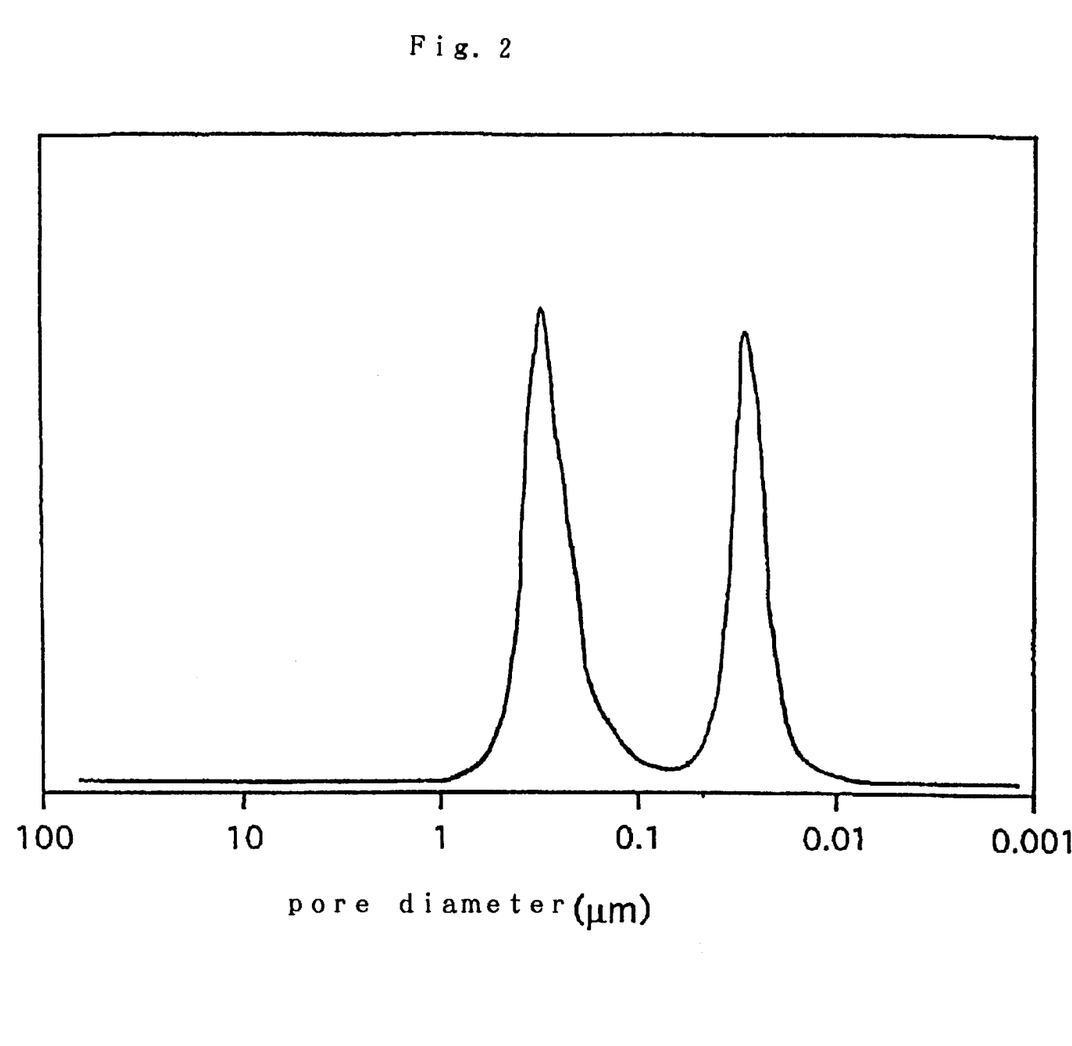
FIG. 2 shows the pore diameter distribution of a catalyst 1-B obtained in Example 1-2.

The composition of this catalyst 1-B was $V_2O_5: WO_3: TiO_2=5:10:85$ (weight ratio). When the pore diameter distribution of the catalyst 1-B was measured by a mercury press-fit porosimeter, the total pore volume of the catalyst 1-B was 0.49 cc/g. The pore volume of the first group of pores and that of the second group of pores were 43% and 51% of the total pore volume, respectively. The specific surface area measured by the BET method of the catalyst 1-B was 71 $m^2/g$. The pore diameter distribution of the catalyst 1-B is shown in FIG. 2.

EXAMPLE 1-3

12.8 kg of titanium tetrachloride ($TiCl_4$) was added dropwise to 80 liters of water to be dissolved while it was cooled with ice and stirred. 1.2 kg of an aqueous solution of ammonium metatungstate (containing 50 wt % of tungsten oxide) was added to this aqueous solution. Ammonia water was added until pH became 6 while the obtained aqueous solution was maintained at a temperature of about 30° C. and well stirred. The resulting mixture was left to be aged for 2 hours. The thus obtained titanium-tungsten precipitate slurry was filtrated and the obtained titanium-tungsten precipitate was washed with water, dried at 150° C. and baked at 600° C. for 5 hours to obtain titanium-tungsten oxide having a titanium oxide/tungsten oxide weight ratio of 90/10.

A solution of 1.4 kg of ammonium metavanadate, 1.7 kg of oxalic acid and 0.4 kg of monoethanolamine dissolved in 5 liters of water was added to 20 kg of a powder of the coprecipitated titanium-tungsten oxide as prepared in the above-mentioned manner, and further 1 kg of phenol resin (Belpar (trade name) of Kanebo Co.) and 0.5 kg of starch as a molding aid were added to and mixed with this resulting mixture and kneaded with a kneader. The resulting mixture was molded into a honeycomb-like form having an outer size of 80 mm×80 mm, an opening of 4.0 mm, a wall thickness of 1.0 mm and a length of 500 mm by an extrusion molding machine. Thereafter, this form was dried at 80° C. and baked at 450° C. for 5 hours in an air atmosphere to obtain a catalyst 1-C.

Figure 3:
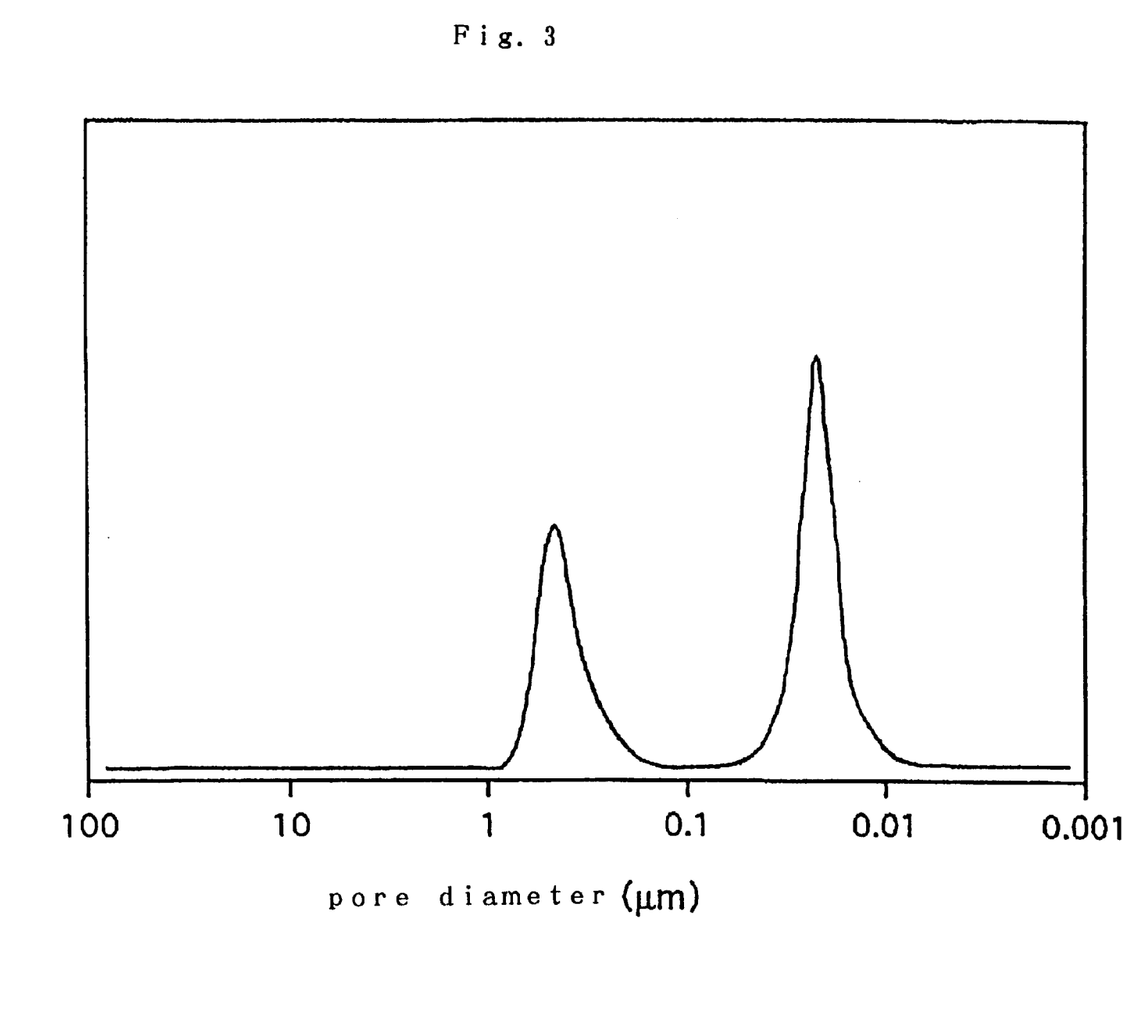
FIG. 3 shows the pore diameter distribution of a catalyst 1-C obtained in Example 1-3.

The composition of this catalyst 1-C was $V_2O_5$: $WO_3$: $TiO_2$=5:10:85 (weight ratio). When the pore diameter distribution of the catalyst 1-C was measured by a mercury press-fit porosimeter, the total pore volume of the catalyst 1-C was 0.37 cc/g. The pore volume of the first group of pores and that of the second group of pores were 57% and 37% of the total pore volume, respectively. The specific surface area measured by the BET method of the catalyst D was 78 $m^2$/g. The pore diameter distribution of the catalyst 1-C is shown in FIG. 3.

Comparative Example 1-1

A honeycomb-like catalyst 1-D having an outer size of 80 mm×80 mm, an opening of 4.0 mm, a wall thickness of 1.0 mm and a length of 500 mm was prepared in the same manner as in Example 1-2 except that the titanium-tungsten oxide powder as used in Example 1-2 was further ground by an air grinder, phenol resin was not added at the time of kneading, and a deaerating layer was provided before the molding machine to remove air contained in the kneaded product.

Figure 4:
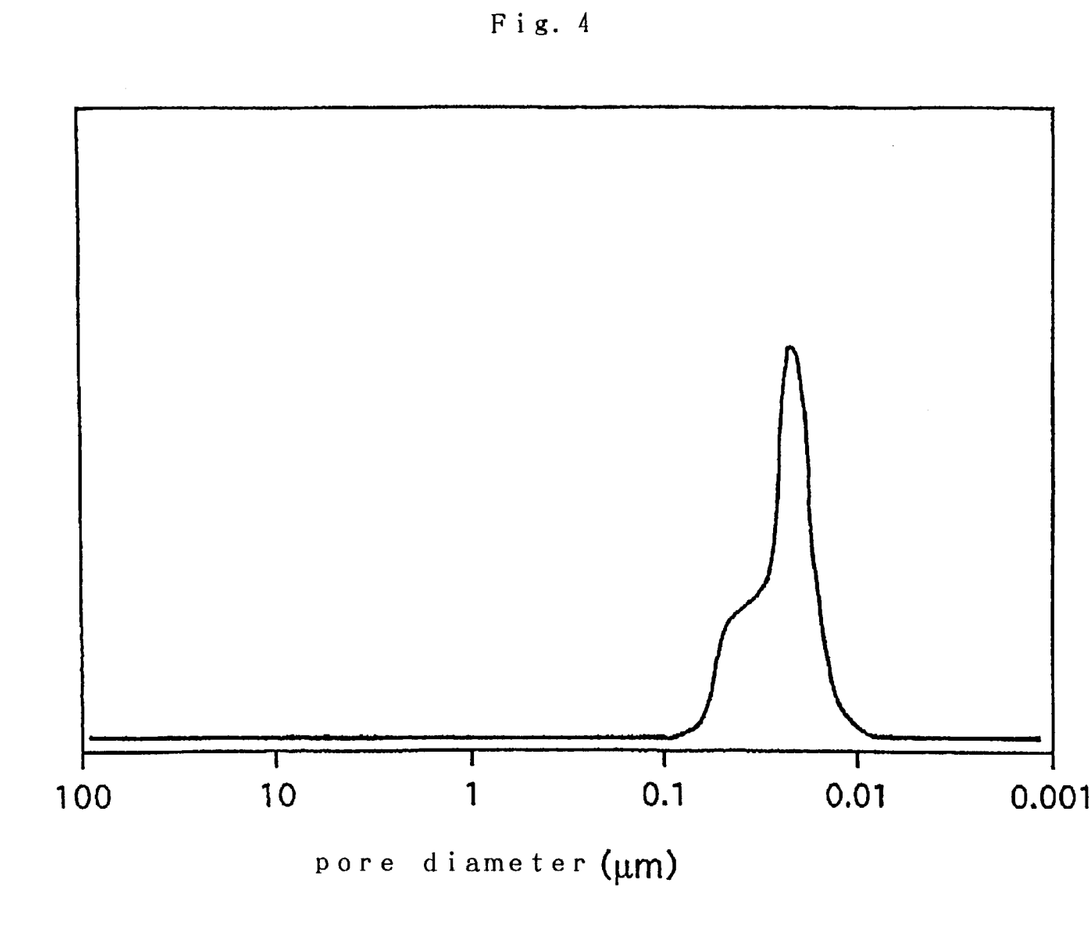
FIG. 4 shows the pore diameter distribution of a catalyst 1-D obtained in Comparative Example 1-1.

When the pore diameter distribution of the catalyst 1-D was measured by a mercury press-fit porosimeter, only the first group of pores having a pore diameter distribution peak in a range of 0.01 to 0.05 $\mu$m was observed and the second group of pores having a pore diameter distribution peak in a range of 0.1 to 0.8 $\mu$m was nonexistent. The total pore volume of the catalyst 1-D was 0.25 cc/g and the specific surface area measured by the BET method thereof was 65 $m^2$/g. The pore diameter distribution of the catalyst 1-D is shown in FIG. 4.

EXAMPLE 1-4

An organic halogen compound removing activity test was carried out using the catalysts 1-A to 1-D obtained in Examples 1-1 to 1-3 and Comparative Example 1-1 under the following conditions. Chlorotoluene (CT) was used as the organic halogen compound.

Test Conditions

CT: 30 ppm, $O_2$:10%, $H_2O$: 15%, $N_2$: balance gas temperature: 150 to 200° C., space velocity (STP): 2,500 or 5,000 $Hr^{-1}$ CT decomposition rate was obtained from the following equation.

CT decomposition rate (%)=[(CT concentration at inlet of reactor)−(CT concentration at outlet of reactor)]÷(CT concentration at inlet of reactor)×100

The relationship between gas temperature and CT decomposition rate at a space velocity of 2,500 $Hr^{-1}$ is shown in Table 1.

TABLE 1

| Gas temperature (° C.) | CT Decomposition rate (%) | | | |
| --- | --- | --- | --- | --- |
| | catalyst 1-A | catalyst 1-B | catalyst 1-C | catalyst 1-D |
| 150 | 57 | 65 | 70 | 33 |
| 170 | 88 | 93 | 95 | 65 |
| 200 | 97 | 98 | 99 | 91 |

The relationship between gas temperature and CT decomposition rate at a space velocity of 5,000 $Hr^{-1}$ is shown in Table 2.

TABLE 2

| gas temperature (° C.) | CT Decomposition Rate (%) | | | |
| --- | --- | --- | --- | --- |
| | catalyst 1-A | catalyst 1-B | catalyst 1-C | catalyst 1-D |
| 150 | 35 | 41 | 45 | 18 |
| 170 | 65 | 73 | 77 | 41 |
| 200 | 82 | 88 | 89 | 70 |

EXAMPLE 1-5

Catalyst 1-C, as obtained in Example 1-3, was brought into contact with a refuse incinerator exhaust gas containing dioxins (hereinafter abbreviated to DXN) of about 10 ng-TEQ/$Nm^3$ to measure the capability of removing DXN. The exhaust gas temperature and the space velocity were as follows:

Exhaust gas temperature: 170 to 250° C.

Space velocity (STP): 2,500 $Hr^{-1}$

The DXN-removing ratio was determined in accordance with the following equation:

DXN-removing ratio (%)=[(DXN concentration at inlet of reactor)−(DXN concentration at outlet of reactor)]÷(DXN concentration at inlet of reactor)×100

The relationship between the gas temperature and the DXN-removing ratio is shown in Table 3 below.

TABLE 3

| Gas temperature (° C.) | DXN-removing ratio (%) |
| --- | --- |
| 170 | 96 |
| 210 | 99 |
| 250 | 99 |

EXAMPLE 2-1

21.3 kg of Snowtex-20 (silica sol containing about 20 wt % of $SiO_2$ of Nissan Chemical Co.) was added to 700 liters of 10 wt % ammonia water, stirred and mixed. Thereafter, 340 liters of a sulfuric acid solution of titanyl sulfate ($TiO_2$ concentration of 125 g/liter and sulfuric acid concentration of 0.55 g/liter) was added dropwise under agitation. The obtained gel was left for 3 hours, filtered, washed with water and dried at 150° C. for 10 hours. The obtained product was baked at 500° C., ground using a hammer mill, and classified by a classifier to obtain a powder having an average particle diameter in a range of 10 mm. The composition of the obtained powder was $TiO_2$:$SiO_2$=8.5:1.5 (molar ratio). According to the X-ray diffraction chart of the powder, an apparent characteristic peak of TiO2 or SiO2 was not seen and it was confirmed by a broad diffraction peak that the powder was titanium-silicon composite oxide having an amorphous fine structure (Ti—Si composite oxide).

A solution of 1.4 kg of ammonium metavanadate, 1.7 kg of oxalic acid and 0.4 kg of monoethanolamine dissolved in 5 liters of water was added to 12 kg of the above-mentioned Ti—Si composite oxide and 8 kg of a commercially available titanium oxide powder (DT-51 (trade name) of Rohne Poolan Co.), and further 1 kg of phenol resin (Belpar (trade name) of Kanebo Co.) and 0.5 kg of starch as a molding aid were added to and mixed with the resulting mixture, and kneaded with a kneader. The resulting mixture was molded into a honeycomb-like form having an outer size of 80 mm×80 mm, an opening of 4.0 mm, a wall thickness of 1.0 mm and a length of 500 mm by an extrusion molding machine. Thereafter, the form was dried at 80° C. and baked at 460° C. for 5 hours in an air atmosphere to obtain a catalyst 2-A.

Figure 5:
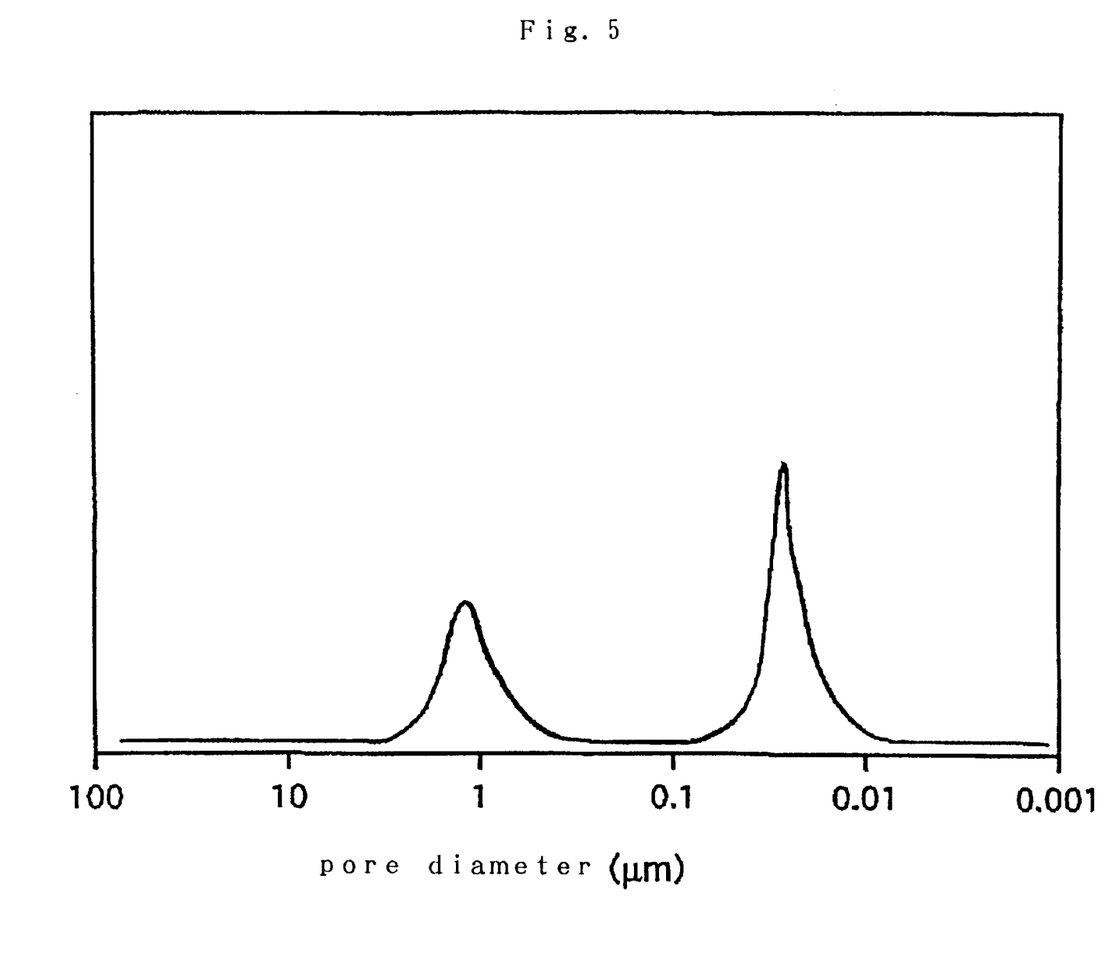
FIG. 5 shows the pore diameter distribution of a catalyst 2-A obtained in Example 2-1.

The composition of the catalyst 2-A was $V_2O_5$:$TiO_2$:Ti—Si composite oxide=5:38:57 (weight ratio). When the pore diameter distribution of the catalyst 2-A was measured by a mercury press-fit porosimeter, the total pore volume of the catalyst 2-A was 0.32 cc/g. The pore volume of the first group and that of the third group were 55% and 40% of the total pore volume, respectively. The specific surface area measured by the BET method of the catalyst 2-A was 89 $m^2$/g. The pore diameter distribution of the catalyst 2-A is shown in FIG. 5.

EXAMPLE 2-2

180 liters of a titanium sulfate solution (titanium dioxide concentration of 100 g/liter) obtained from the production process of titanium oxide by a sulfuric acid method was heated at 100° C. and 5 liters of a 10% methylamine aqueous solution of ammonium paratungstate (tungsten trioxide concentration of 400 g/liter) was added to the obtained titanium oxide sol. Ammonia water was added dropwise under agitation, pH was adjusted to 8, and the precipitate was filtrated, dried at 100° C. for 12 hours and baked at a temperature of 500° C. to obtain a titanium-tungsten oxide powder (titanium oxide/tungsten oxide weight ratio=90/10). According to the X-ray diffraction of this oxide, a peak derived from tungsten oxide was not observed.

A solution of 1.4 kg of ammonium metavanadate, 1.7 kg of oxalic acid and 0.4 kg of monoethanolamine dissolved in 5 liters of water was added to 8 kg of this titanium-tungsten oxide powder and 12 kg of Ti—Si composite oxide prepared in the same manner as in Example 2-1, and further 1 kg of phenol resin (Belpar (trade name) of Kanebo Co.) and 0.5 kg of starch as a molding aid were added to and mixed with the resulting mixture and kneaded with a kneader. The resulting mixture was molded into a honeycomb-like form having an outer size of 80 mm×80 mm, an opening of 4.0 mm, a wall thickness of 1.0 mm and a length of 500 mm by an extrusion molding machine. Thereafter, the form was dried at 80° C. and baked at 450° C. for 5 hours in an air atmosphere to obtain a catalyst 2-B.

Figure 6:
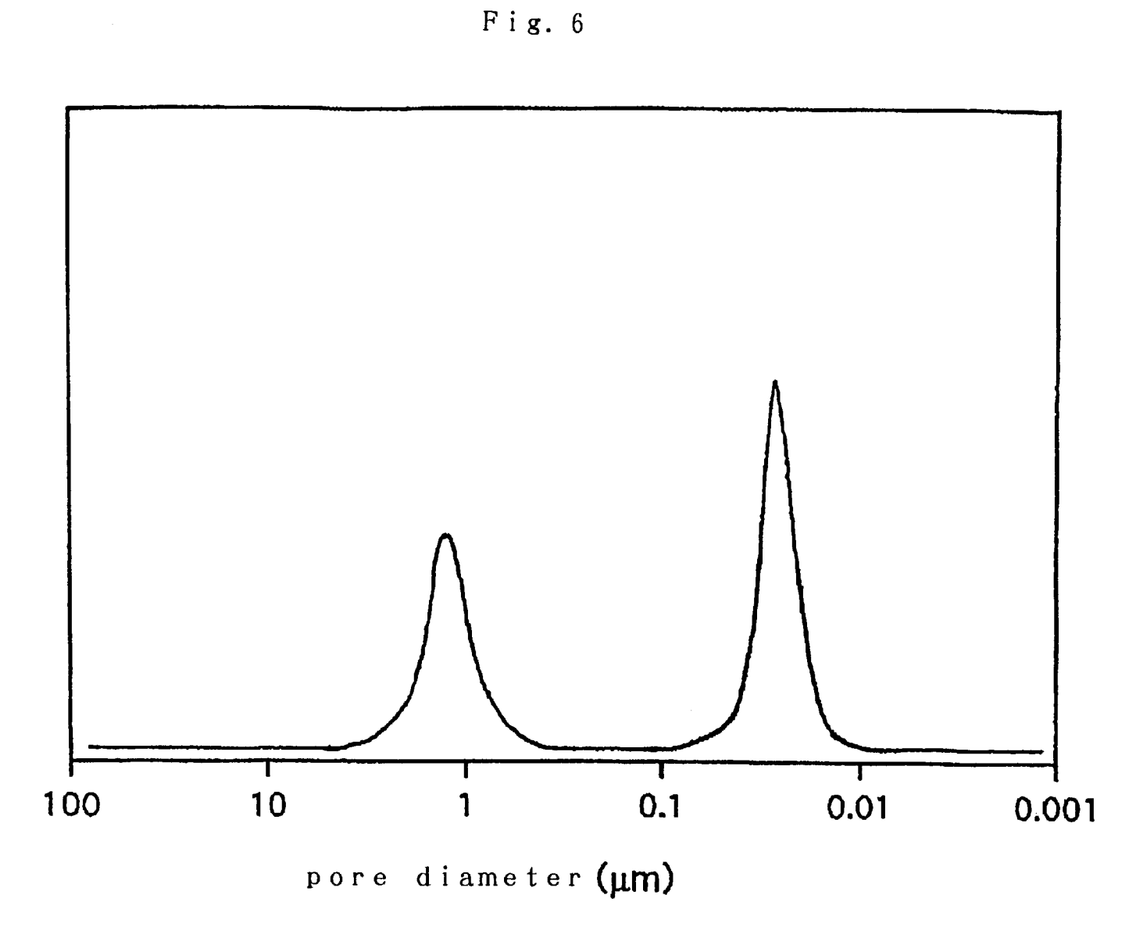
FIG. 6 shows the pore diameter distribution of a catalyst 2-B obtained in Example 2-2.

The composition of the catalyst 2-B was $V_2O_5$:$WO_3$:$TiO_2$:Ti—Si=5:4:34:57 (weight ratio). When the pore diameter distribution of the catalyst 2-B was measured by a mercury press-fit porosimeter, the total pore volume of the catalyst 2-B was 0.38 cc/g. The pore volume of the first group and that of the third group were 52% and 43% of the total pore volume, respectively. The specific surface area measured by the BET method of the catalyst 2-B was 95 $m^2$/g. The pore diameter distribution of the catalyst 2-B is shown in FIG. 6.

EXAMPLE 2-3

A solution of 1.4 kg of ammonium metavanadate, 1.7 kg of oxalic acid and 0.4 kg of monoethanolamine dissolved in 5 liters of water was added to 8 kg of a coprecipitated titanium-tungsten oxide powder as prepared in the same manner as in Example 1-3 and to 12 kg of Ti—Si composite oxide as prepared in the same manner as in Example 2-1, and further 1 kg of phenol resin (Belpar (trade name) of Kanebo Co.) and 0.5 kg of starch as a molding aid were added to and mixed with the resulting mixture, and kneaded with a kneader. The resulting mixture was molded into a honeycomb-like form having an outer size of 80 mm×80 mm, an opening of 4.0 mm, a wall thickness of 1.0 mm and a length of 500 mm by an extrusion molding machine. Thereafter, the form was dried at 80° C. and baked at 450° C. for 5 hours in an air atmosphere to obtain a catalyst 2-C.

Figure 7:
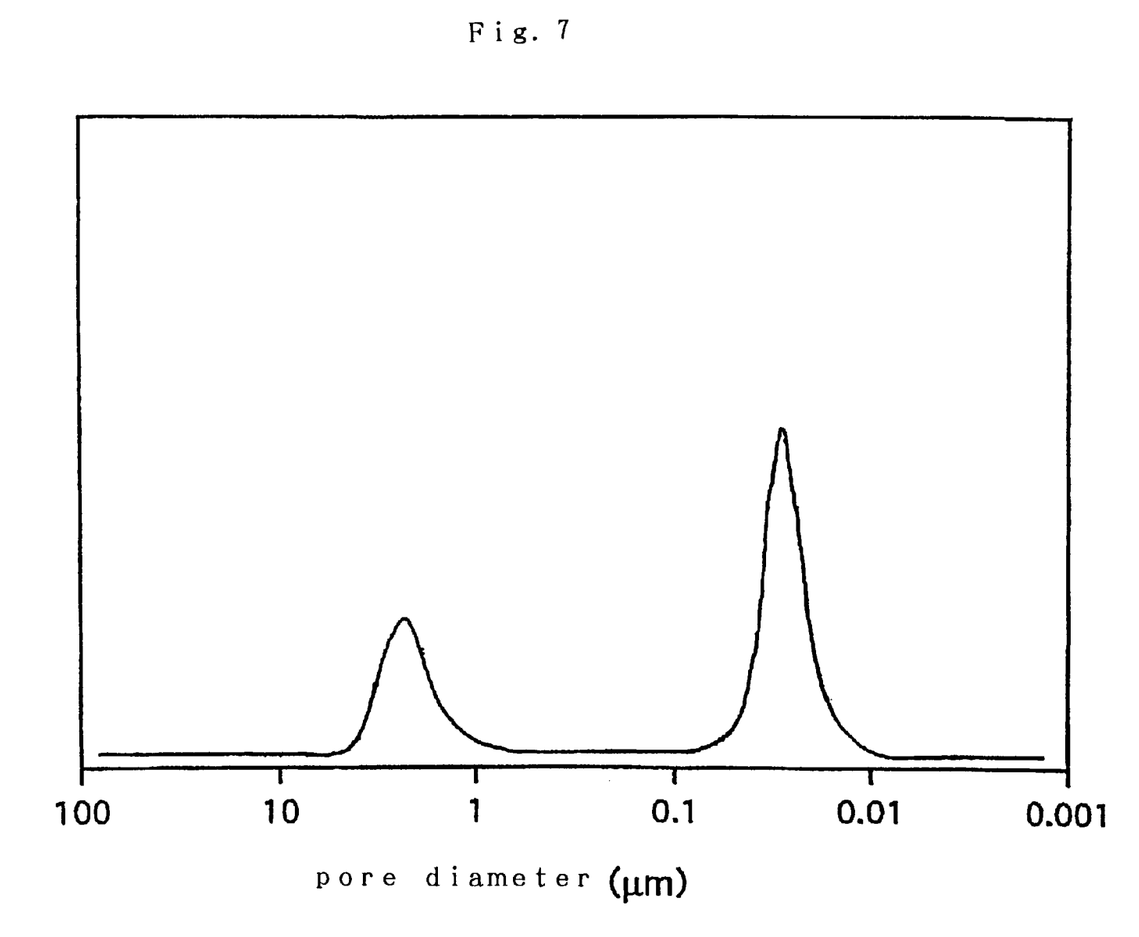
FIG. 7 shows the pore diameter distribution of a catalyst 2-C obtained in Example 2-3.

The composition of this catalyst 2-C was $V_2O_5$: $WO_3$: $TiO_2$:Ti—Si=5:6:32:57 (weight ratio). When the pore diameter distribution of the catalyst 2-C was measured by a mercury press-fit porosimeter, the total pore volume of the catalyst 2-C was 0.32 cc/g. The pore volume of the first group of pores and that of the third group of pores were 58% and 31% of the total pore volume, respectively. The specific surface area measured by the BET method of the catalyst D was 102 $m^2$/g. The pore diameter distribution of the catalyst 2-C is shown in FIG. 7.

Comparative Example 2-1

A honeycomb-like catalyst 2-D having an outer size of 80 mm×80 mm, an opening of 4.0 mm, a wall thickness of 1.0 mm and a length of 500 mm was prepared in the same manner as in Example 2-2 except that the titanium-tungsten oxide powder and the Ti—Si composite oxide, as were used in Example 2-2, were further ground by an air grinder, methacrylic resin was not added at the time of kneading, and a deaerating layer was provided before the molding machine to remove air contained in the kneaded product.

Figure 8:
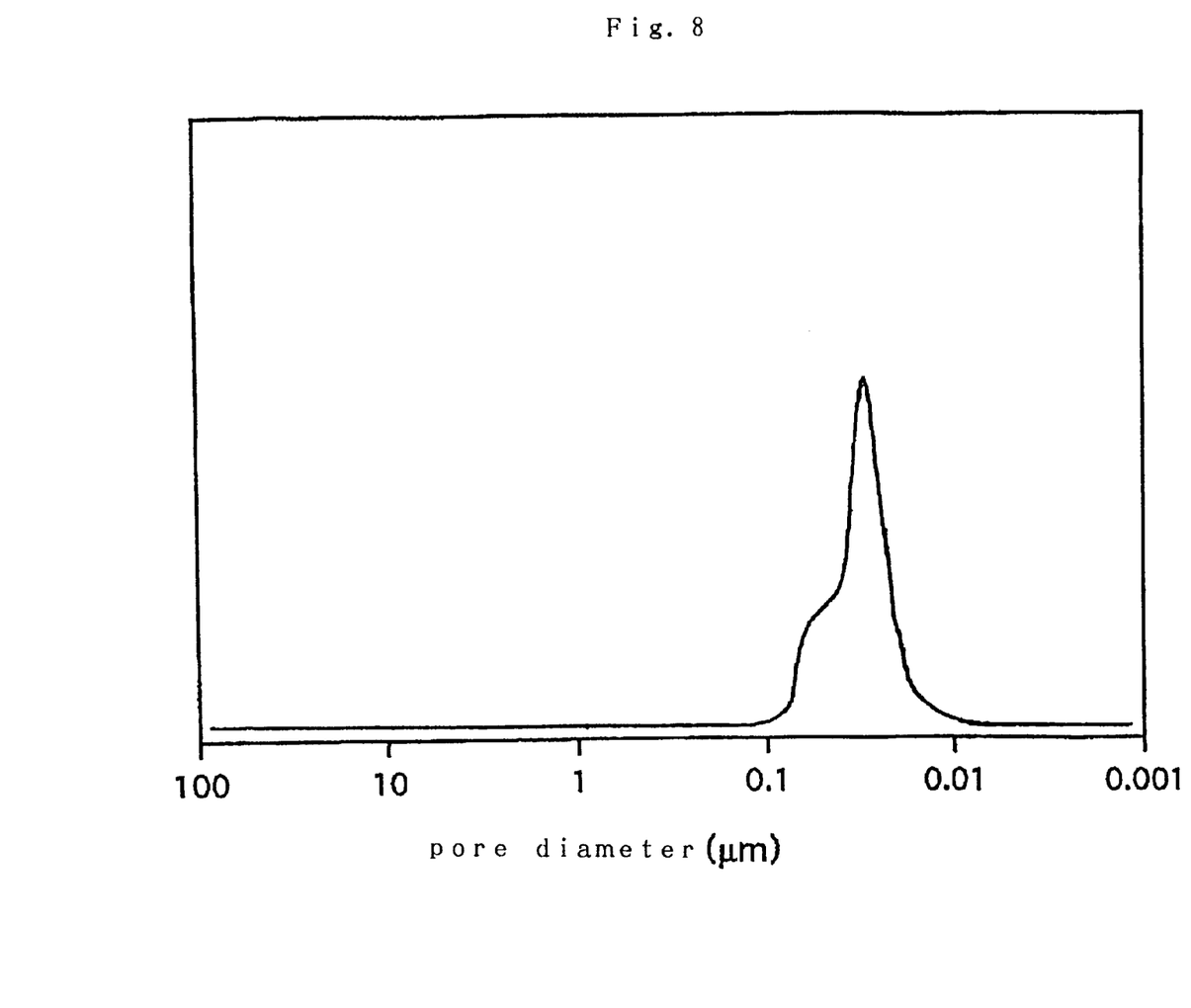
FIG. 8 shows the pore diameter distribution of a catalyst 2-D obtained in Comparative Example 2-1.

When the pore diameter distribution of the catalyst 2-D was measured by a mercury press-fit porosimeter, only the first group of pores having a pore diameter distribution peak in a range of 0.01 to 0.05 μm was observed and the third group of pores having a pore diameter distribution peak in a range of 0.8 to 4 μm was nonexistent. The total pore volume of the catalyst 2-D was 0.22 cc/g and the specific surface area measured by the BET method thereof was 88 $m^2$/g. The pore diameter distribution of the catalyst 2-D is shown in FIG. 8.

EXAMPLE 2-4

An organic halogen compound removing activity test was carried out using the catalysts 2-A to 2-D obtained in Examples 2-1 to 2-3 and Comparative Example 2-1 under the following conditions. Chlorotoluene (CT) was used as the organic halogen compound.

Test Conditions

CT: 30 ppm, $O_2$: 12%, $N_2$: balance gas temperature: 150 to 200° C., space velocity (STP): 4,000 $Hr^{-1}$ CT decomposition rate was obtained from the following equation.

CT decomposition rate (%)=[(CT concentration at inlet of reactor)−(CT concentration at outlet of reactor)]÷(CT concentration at inlet of reactor)×100

The relationship between gas temperature and CT decomposition rate is shown in Table 4.

TABLE 4

| Gas temperature (° C.) | CT Decomposition rate (%) | | | |
| --- | --- | --- | --- | --- |
| | catalyst 2-A | catalyst 2-B | catalyst 2-C | catalyst 2-D |
| 150 | 53 | 59 | 63 | 35 |
| 170 | 82 | 87 | 89 | 66 |
| 200 | 92 | 95 | 96 | 89 |

EXAMPLE 2-5

Catalyst 2-C, as obtained in Example 2-3, was brought into contact with a refuse incinerator exhaust gas containing dioxins (hereinafter abbreviated to DXN) of about 20 ng-TEQ/Nm$^3$ to measure the capability of removing DXN. The exhaust gas temperature and the space velocity were as follows:

Exhaust gas temperature: 200 to 300° C.

Space velocity (STP): 5,000 Hr$^{-1}$

The DXN-removing ratio was determined in the same way as of Example 1-5.

The relationship between the gas temperature and the DXN-removing ratio is shown in Table 5 below.

TABLE 5

| Gas temperature (° C.) | DXN-removing ratio (%) |
| --- | --- |
| 200 | 97 |
| 250 | 98 |
| 300 | 98 |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A method for removing organic halogen compounds, which method comprises the step of bringing a catalyst component into contact with organic halogen compounds, wherein the catalyst component comprises titanium oxide and "said titanium oxide having a bimodal pore distribution wherein the first group of pores having a pore diameter distribution peak in a range of 0.01 to 0.05 µm and the second group of pores having a pore diameter distribution peak in a range of 0.1 to 0.8 µm with essentially all the pore volume of the titanium oxide being in said ranges".

2. A method according to claim 1, wherein the total pore volume measured by a mercury press-fit method is in a range of 0.2 to 0.6 cc/g, the pore volume of the group of pores having a pore diameter distribution peak in a range of 0.01 to 0.05 µm accounts for 10 to 60% of the total pore volume, and the pore volume of the group of pores having a pore diameter distribution peak in a range of 0.1 to 0.8 µm accounts for 10 to 60% of the total pore volume, said pores' groups providing essentially 100% of the pore volume of the titanium oxide.

3. A method according to claim 2, further comprising either or both of vanadium oxide and tungsten oxide as catalyst components.

4. A method for removing organic halogen compounds, which comprises the step of bringing an exhaust gas containing an organic halogen compound into contact with a catalyst as recited in claim 2.

5. A method according to claim 1, further comprising either or both of vanadium oxide and tungsten oxide as catalyst components.

6. A method for removing organic halogen compounds, which comprises the step of bringing an exhaust gas containing an organic halogen compound into contact with a catalyst as recited in claim 5.

7. The method according to claim 5, wherein either of vanadium oxide and tungsten oxide is added as a catalyst component in an amount of 0.1 to 25 wt % relative to an amount of titanium oxide.

8. The method according to claim 5, wherein both of vanadium oxide and tungsten oxide are added as catalyst components, with vanadium oxide being added in an amount of 0.1 to 25 wt % relative to an amount of titanium oxide, and with tungsten oxide being added in an amount of 0.1 to 25 wt % relative to the amount of titanium oxide.

9. The method according to claim 5, wherein the catalyst components of titanium oxide and tungsten oxide are mixed together to a high degree so as to obtain a uniformly dense mixture and such that an X-ray diffraction of said mixture produces substantially no peak derived from tungsten oxide.

10. A method for removing organic halogen compounds, which comprises the step of bringing an exhaust gas containing an organic halogen compound into contact with a catalyst as recited in claim 1.

11. The method according to claim 1, wherein the catalyst component comprises a catalyst in the shape of a particle, with the particle having a specific surface area measured by a BET method of 30 to 250 m$_2$/g.

12. The method according to claim 1, wherein each of the pore diameter distribution peaks includes a pore diameter distribution that is substantially uniform.

13. A method for removing organic halogen compounds, which method comprises the step of bringing catalyst components into contact with organic halogen compounds, wherein one of the catalyst components comprises titanium oxide and the other catalyst component comprises a titanium-silicon composite oxide, "having a bimodal pore distribution wherein each of the catalyst components comprises two groups of pores, wherein the first group of pores has a pore diameter distribution peak in a range of 0.01 to 0.05 µm and wherein the second group of pores has a pore diameter distribution peak in a range of 0.8 to 4 µm with essentially all the pore volume of the said components being in said ranges."

14. A method according to claim 13, wherein the total pore volume measured by a mercury press-fit method is in a range of 0.2 to 0.6 cc/g, the pore volume of the group of pores having a pore diameter distribution peak in a range of 0.01 to 0.05 µm accounts for 20 to 60% of the total pore volume, and the pore volume of the group of pores having a pore diameter distribution peak in a range of 0.8 to 4 gm accounts for 10 to 50% of the total pore volume, said pores' groups providing essentially 100% of the pore volume of said components.

15. A method according to claim 14, further comprising either or both of vanadium oxide and tungsten oxide as catalyst components.

16. A method for removing organic halogen compounds, which comprises the step of bringing an exhaust gas containing an organic halogen compound into contact with a catalyst as recited in claim 14.

17. The method according to claim 14, wherein the pore volume of the group of pores having a pore diameter distribution peak in a range of 0.8 to 4 µm accounts for 31 to 50% of the total pore volume.

18. A method according to claim 13, further comprising either or both of vanadium oxide and tungsten oxide as catalyst components.

19. The method according to claim 18, wherein either of vanadium oxide and tungsten oxide is added as a catalyst component in an amount of 0.1 to 25 wt % relative to an amount of titanium oxide.

20. The method according to claim 18, wherein both of vanadium oxide and tungsten oxide are added as catalyst components, with vanadium oxide being added in an amount of 0.1 to 25 wt % relative to a total amount of titanium oxide and titanium-silicon composite oxide, and with tungsten oxide being added in an amount of 0.1 to 25 wt % relative to the total amount of titanium oxide and titanium-silicon composite oxide.

21. The method according to claim 18, wherein the catalyst components of titanium oxide and titanium-silicon composite oxide and tungsten oxide are mixed together to a high degree so as to obtain a uniformly dense mixture and such that an X-ray diffraction of said mixture produces substantially no peak derived from tungsten oxide.

22. A method for removing organic halogen compounds, which comprises the step of bringing an exhaust gas containing an organic halogen compound into contact with a catalyst as recited in claim 13.

23. The method according to claim 13, wherein the catalyst components comprise a catalyst in the shape of a particle, with the particle having a specific surface area measured by a BET method of 30 to 250 m²/g.

24. The method according to claim 13, wherein each of the pore diameter distribution peaks includes a pore diameter distribution that is substantially uniform.

25. The method according to claim 13, wherein an amount of titanium-silicon composite oxide is 0.01 to 5 times by weight an amount of titanium oxide.

26. A method for removing organic halogen compounds according to claim 1, wherein said pore groups provide about 90% or more of the pore volume of the titanium oxide.

27. A method of removing organic halogen compounds according to claim 1, wherein:
a) each of the pore diameter distribution peaks is produced by plotting pore diameter on an "x" axis against the number of pores having a certain pore diameter on a "y" axis to obtain a graph showing a bimodal pore distribution;
b) the graph includes each of the pore diameter distribution peaks;
c) each of the peaks is produced by a first line representing an increase in the number of pores having a certain pore diameter and a second line representing a decrease in the number of pores having a certain pore diameter, with said peak being between the first and second lines; and
d) said phrase "essentially all the pore volumes of the titanium oxide being in said range" includes the following:
i) for the first group of pores, those pores having a pore diameter slightly less than the value of 0.01 μm where said pores are on or below the first line;
ii) for the first group of pores, those pores having a pore diameter slightly greater than the value of 0.05 μm where said pores are on or below the second line;
iii) for the second group of pores, those pores having a pore diameter slightly less than the value of 0.1 μm where said pores are on or below the first line; and
iv) for the second group of pores, those pores having a pore diameter slightly greater than the value of 0.8 μm where said pores are on or below the second line.

28. A method for removing organic halogen compounds according to claim 13, wherein said pore groups provide about 89% or more of the pore volume of said components.

29. A method for removing organic halogen compounds according to claim 13, wherein:
a) each of the pore diameter distribution peaks is produced by plotting pore diameter on an "x" axis against the number of pores having a certain pore diameter on a "y" axis to obtain a graph showing a bimodal pore distribution;
b) the graph includes each of the pore diameter distribution peaks;
c) each of the peaks is produced by a first line representing a increase in the number of pores having a certain pore diameter and a second line representing a decrease in the number of pores having a certain pore diameter, with said peak being between the first and second lines; and
d) said phrase "essentially all the pore volumes of said components being in said ranges" includes the following:
i) for the first group of pores, those pores having a pore diameter slightly less than the value of 0.01 μm where said pores are on or below the first line;
ii) for the first group of pores, those pores having a pore diameter slightly greater than the value of 0.05 μwhere said pores are on or below the second line;
iii) for the second group of pores, those pores having a pore diameter slightly less than the value of 0.8 μm where said pores are on or below the first line; and
iv) for the second group of pores, those pores having a pore diameter slightly greater than the value of 4 μm where said pores are on or below the second line.

30. A method for removing organic halogen compounds, which method comprises the step of bringing a catalyst component into contact with organic galogen compounds wherein the catalyst component comprises titanium oxide, said titanium oxide having a bimodal pore distribution, wherein the first group of pores define a first pore diameter distribution curve and a first pore volume and wherein the second group of pores define a second pore diameter distribution curve and a second pore volume, with all of the pores and thus all of the pore volumes being on or under said two pore diameter distribution curves, wherein each of the pores of said first group of pores has a diameter in a range of about 0.01 to about 0.05 μm, and wherein each of the pores of the second group of pores has a diameter in a range of about 0.1 to about 0.8 μm, with about 90% or more of the pore volumes of the titanium oxide being in ranges of exactly 0.01 to exactly 0.05 μm and exactly 0.1 to exactly 0.8 μm.

31. A method for removing organic halogen compounds, which method comprises the step of bringing catalyst components into contact with organic halogen compounds, wherein one of the catalyst components comprises titanium oxide and the other catalyst components comprises a titanium-silicon composite oxide having a bimodal pore distribution, wherein each of the catalyst components comprises first and second groups of pores, wherein the first group of pores define a first pore diameter distribution curve and a first pore volume and wherein the second group of pores define a second pore diameter distribution curve and a second pore volume, with all of the pores and thus all of the pore volumes being on or under said first and second pore diameter distribution curves, wherein each of the pores of said first group of pores has a diameter ina range of about 0.01 to about 0.05 μm and wherein each of the pores of said second group pores has a diameter in a range of about 0.8 to about 4 μm, with about 89% or more of the pore volumes of said components being in ranges of exactly 0.01 to exactly 0.05 μm and exactly 0.8 to exactly 4 μm.

* * * * *